United States Patent [19]

Yoshikawa

[11] Patent Number: 5,109,367
[45] Date of Patent: Apr. 28, 1992

[54] OPTICAL INFORMATION RECORDING AND REPRODUCING APPARATUS PERFORMING FOCUS AND/OR TRACK CONTROL BY NORMALIZED ERROR SIGNALS

[75] Inventor: Shoji Yoshikawa, Hachioji, Japan

[73] Assignee: Olympus Optical Co., Ltd., Tokyo, Japan

[21] Appl. No.: 585,566

[22] Filed: Sep. 20, 1990

[30] Foreign Application Priority Data

Sep. 21, 1989 [JP] Japan ................... 1-247823

[51] Int. Cl.$^5$ ............. G11B 7/95; G11B 7/00
[52] U.S. Cl. .................. 369/44.25; 369/44.32; 369/44.36; 369/54
[58] Field of Search ............. 369/44.25–44.36, 369/44.11, 54, 124, 116, 32; 250/201.5

[56] References Cited

U.S. PATENT DOCUMENTS

| 4,707,648 | 11/1987 | Minami ............. | 369/44.35 |
| 4,823,330 | 4/1989 | Arter et al. ....... | 369/44.35 |
| 4,975,895 | 12/1990 | Yanazi ............. | 369/44.29 |
| 4,977,551 | 12/1990 | Minami et al. ..... | 369/44.25 |

FOREIGN PATENT DOCUMENTS 58-158046 9/1983 Japan .
60-32264 7/1985 Japan .
63-78386 4/1988 Japan .

Primary Examiner—Roy N. Envall, Jr.
Assistant Examiner—Thang V. Tran
Attorney, Agent, or Firm—Armstrong, Nikaido, Marmelstein, Kubovcik & Murray

[57] ABSTRACT

For an output signal of an error signal generating circuit generating a focus error signal and/or track error signal, it is materialized that a highly precise servo system can sufficiently deal with the case in which the change of the light intensity by switching recording and reproducing or the like and the dispersion of offset and sensitivity by an optical system exist, by providing with a compensating operational circuit generating a normalized focus and/or track error signal being independent of the reflected light intensity from a recording medium and/or the light intensity distribution and also the difference of sensitivity, and by providing with a bias applying circuit applying a bias component for deleting offset and so forth in the signal of this compensating operational circuit.

14 Claims, 4 Drawing Sheets

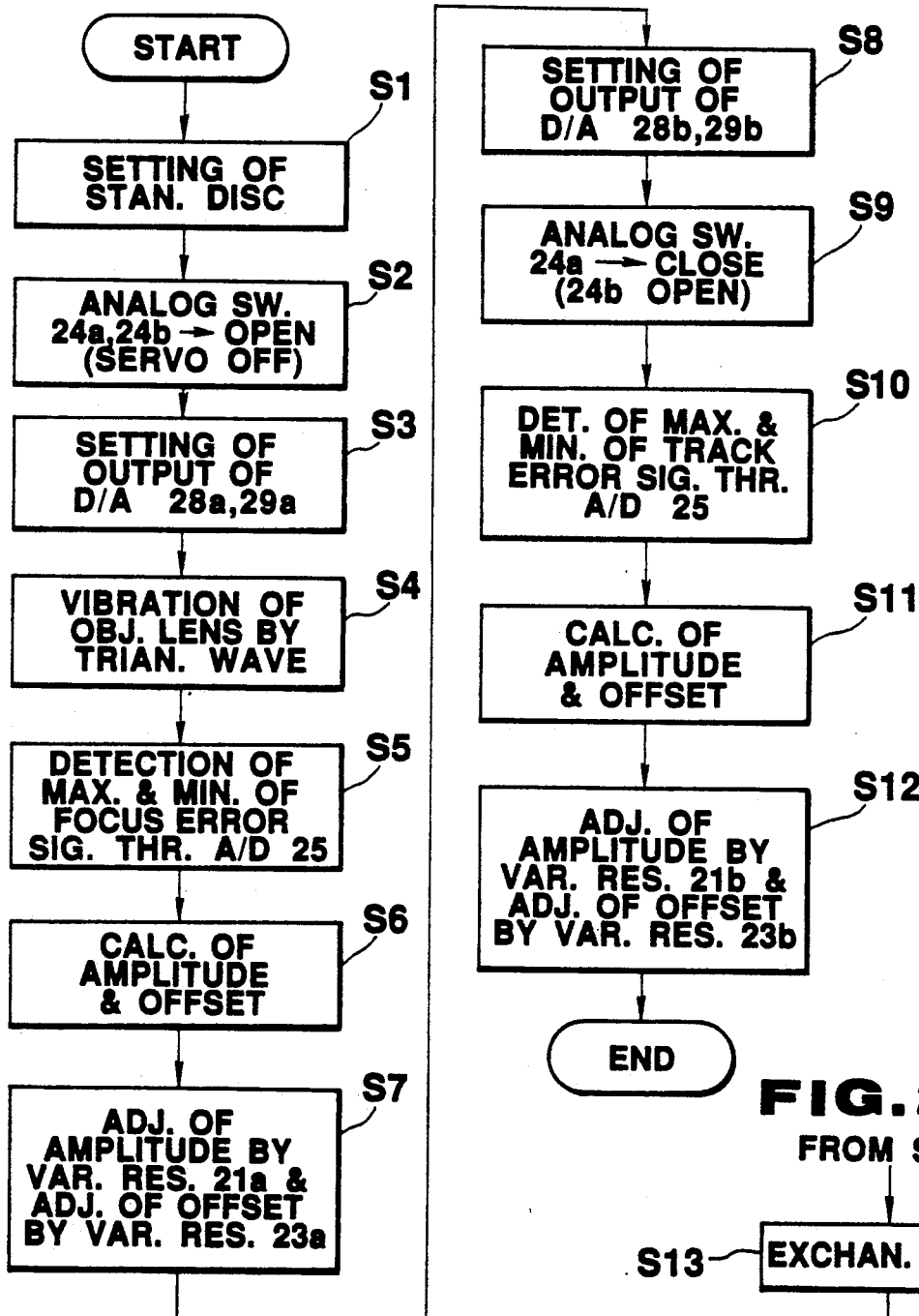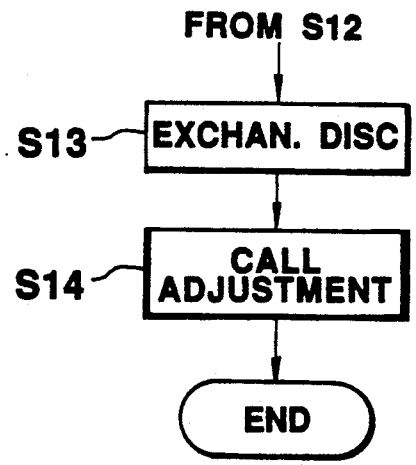

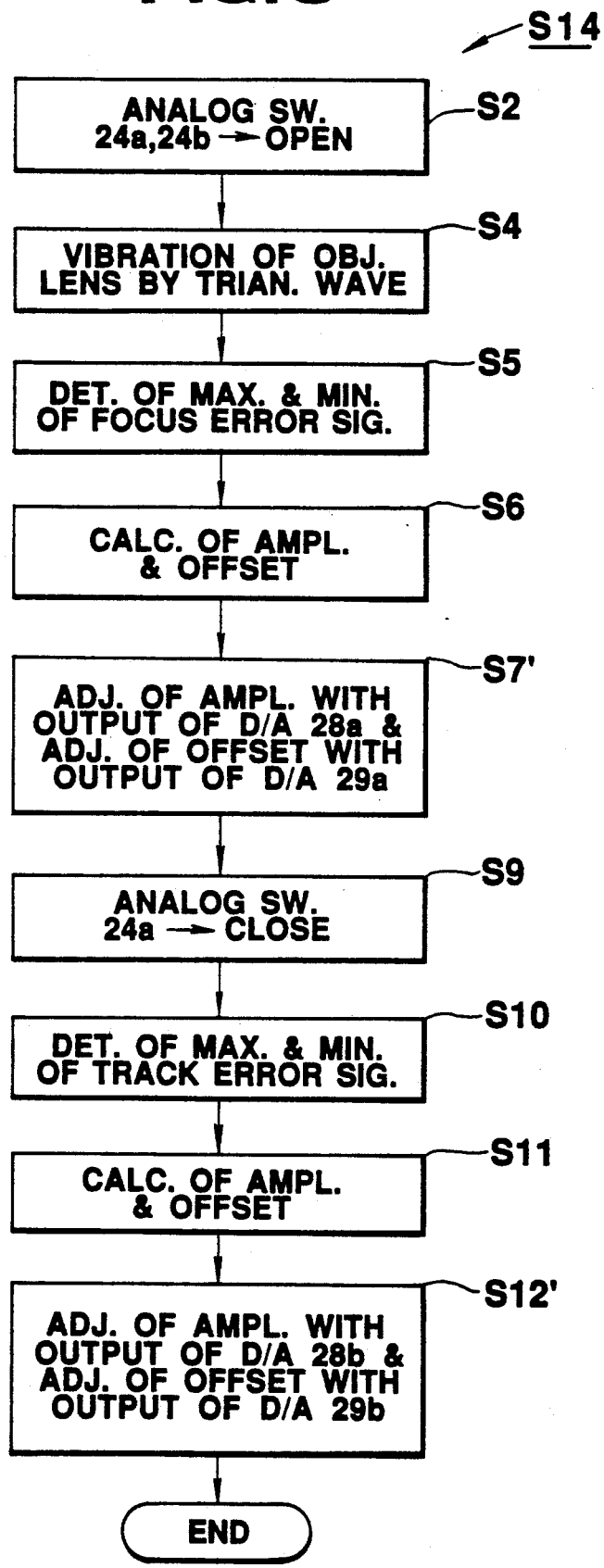

OPTICAL SYS. UNIT 41 | 42 ELEC. SYS. UNIT

OPTICAL INFORMATION RECORDING AND REPRODUCING APPARATUS PERFORMING FOCUS AND/OR TRACK CONTROL BY NORMALIZED ERROR SIGNALS

BACKGROUND OF THE INVENTION

Field of the Invention

This invention relates to an optical information recording and reproducing apparatus performing a focus and/or track control by normalized focus and/or track error signals.

Recently, there has come into practical use of an optical (optical type) information recording and reproducing apparatus wherein, by condensing laser light and projecting the light onto a recording medium instead of using a magnetic head, the information can be optically recorded and the recorded information can be reproduced.

In the above mentioned optical information recording and reproducing apparatus (there are cases where this apparatus is mentioned just as an apparatus hereinafter), the information of much higher density can be recorded than the case of a magnetic head, and the high densely recorded information can be reproduced by condensing laser light so that the apparatus is expected to come into wide use in the future.

In this apparatus, the information can be high densely recorded and/or reproduced, but on the other hand, unless the tracking which makes a light spot follow on a track, where focusing or information is recorded (or being recorded), so as to bring the light spot projected onto a recording medium under control to become a focusing state, is highly precisely performed, the information to be an object cannot be correctly reproduced.

Because of the adjusting accuracy of an optical pickup or the adjusting condition of a signal detecting system or the like, the above mentioned focusing or tracking generates an offset and there are cases where the accuracy of the focusing or tracking is deteriorated.

In a focusing control, a problem in that a detected error signal (a focus error signal) fluctuates on a large scale is created. This problem results from the structural dispersion which is caused in each performance of the optical pickup and medium related to the detection of error signals. As for the optical pickup, the dispersion of the optical performance of an optical element such as a lens or prism, a mechanical error of a fitting position and an output fluctuation of laser exist, and in the medium, the dispersion of reflectance and the dispersion of pre-groove shape exists. Because of this dispersion, the light intensity and/or the distribution of the light intensity inputting into a photoelectrically converting means detecting an error signal vary and there are problems in that the servo is pulled in a different position from the true focal position due to the generation of offset and in that a stable servo control cannot be carried out due to the wide varying range of an error signal. Therefore, this focusing control will be mentioned as follows. An optical system is adjusted so that the true optical focal point can be detected; however, an optical mechanical adjustment has a limit, which is about 1/10 ($\mu$m).

Accordingly, by the focal point shifts by means of the mechanical offset in the optical system, that is to say, by the focus offset, there is a possibility that the servo is carried out on a different position from the true focal position in a state of focusing servo.

Because of this, for example, in the first prior art disclosed in the Gazette of Japanese Patent laid open No. 158046/1983, an offset canceling means in a focusing servo system is disclosed. That is, the sum signal being proportional to the total light intensity obtained in a detecting system is amplified to the offset level of the focus error signal and is input into an adder or subtracter with the focus error signal so that the offset is canceled.

In the meantime, if it is concretely considered that the sensitivity of the detecting system varies in accordance with the reflectance of the recording medium or the fluctuation of the light intensity of the laser diode, 10 to 60 percent of the reflectance and seven to eight times as large as the fluctuation of the light intensity are actually generated so that the sensitivity of the detecting system can vary about fifty times as large as the variation between the sensitivity of the largest case and of the smallest case.

In the above described prior art, if the use of the offset means is restricted only to the reproduction, the means can be materialized; however, in the case of a recording and reproducing apparatus, the light intensity further varies widely between recording and reproducing, therefore, it is necessary to vary the servo gain according to this variation. For example, in the case of reproducing, since the light intensity of laser diode is smaller than the case of the recording (write emitting level), the servo gain for the focus error signal obtained in the detecting system should be made larger enough to supply the servo gain to a focusing actuator.

There are some causes of changing the function of the servo system related to the sensitivity which is chiefly dependent upon the change of the function and others are barely dependent upon the change (a level shift offset) if the servo gain is changed. Therefore, even if the offset can be canceled each other in a state of the servo gain by the method of the prior art, it becomes difficult to compensate the remarkable change of the servo gain and it is practically very difficult to apply stable control to the servo system.

Also, in the second prior art of the Gazette of Japanese Patent laid open No. 78386/1988, positive and negative peak values of an error signal which can be obtained where a servo loop of the servo apparatus is open are detected so that an offset value is calculated from the average value of these peak values, and an offset compensating circuit which subtracts this offset value from the error signal in the case in which the servo loop is closed is disclosed.

In this prior art, in the same manner of the first prior art, a compensating means of the servo gain for the variation (or dispersion) of the sensitivity of a detecting system or the sensitivity of an actuator or the like is not included so that a stable control state can not be established.

Further, in the third prior art of the Gazette of Japanese Patent laid open No. 32264/1985, an optical reproducing apparatus is disclosed. This apparatus keeps a loop gain always constant by subtracting the sum signal being proportional to the total light intensity from a track error signal without depending on the characteristics of the reflectance of a recording medium, the intensity of a light source, an optical detecting element and so forth.

However, in the case of maintaining the apparatus, it is considered to convert an unit as the unit in which the inside of the apparatus is easily maintained. However, for example, in the case in which an optical system is exchanged as an unit, the above mentioned three cases of prior art do not have a means for compensating only the optical deviation included in this optical system. Therefore, a difference in the performance of apparatuses is created according to exchanged units, respectively, if circumstances require, the performance of the constructed apparatus should be evaluated and adjusted, which interferes with the skill performing the maintenance, the number of manufacturing process, a regulator and so forth.

OBJECT AND SUMMARY OF THE INVENTION

An object of this invention is to provide an optical information recording and reproducing apparatus in which a stable servo function operates even in the case in which the change of the laser light intensity and/or the dispersion of reflectance of a recording medium exists.

Another object of this invention is to provide an optical information recording and reproducing apparatus in which a servo mechanism can sufficiently work by omitting readjustment or by little adjustment even in the case in which an optical pickup or the like is exchanged.

In this invention, for an output signal of a photoelectrically converting means for detecting a focus error signal and/or track error signal, in this invention, a highly precise servo system is materialized by providing a correcting means for generating a normalized focus and/or track error signal without being controlled by the reflected light intensity and/or the distribution of the light intensity from the recording medium which is input to this photoelectrically converting means and a bias applying means for applying a bias component for deleting an offset or the like from the signal of the correcting means. The servo system can sufficiently deal with the variation of the light intensity of a beam generating means caused by a change of recording for reproducing, the dispersion of offsets and sensitivity and so forth in accordance with the optical system.

BRIEF DESCRIPTION OF THE DRAWINGS

FIGS. 1 to 3 relate to the first embodiment of this invention.

FIG. 1 is a diagram showing an optical information recording and reproducing apparatus of the first embodiment.

FIGS. 2A, 2B and 3 are the flowcharts showing the process for adjusting a servo system to a proper state.

DETAILED DESCRIPTION OF THE PREFERRED EMBODIMENTS

Figure 1:
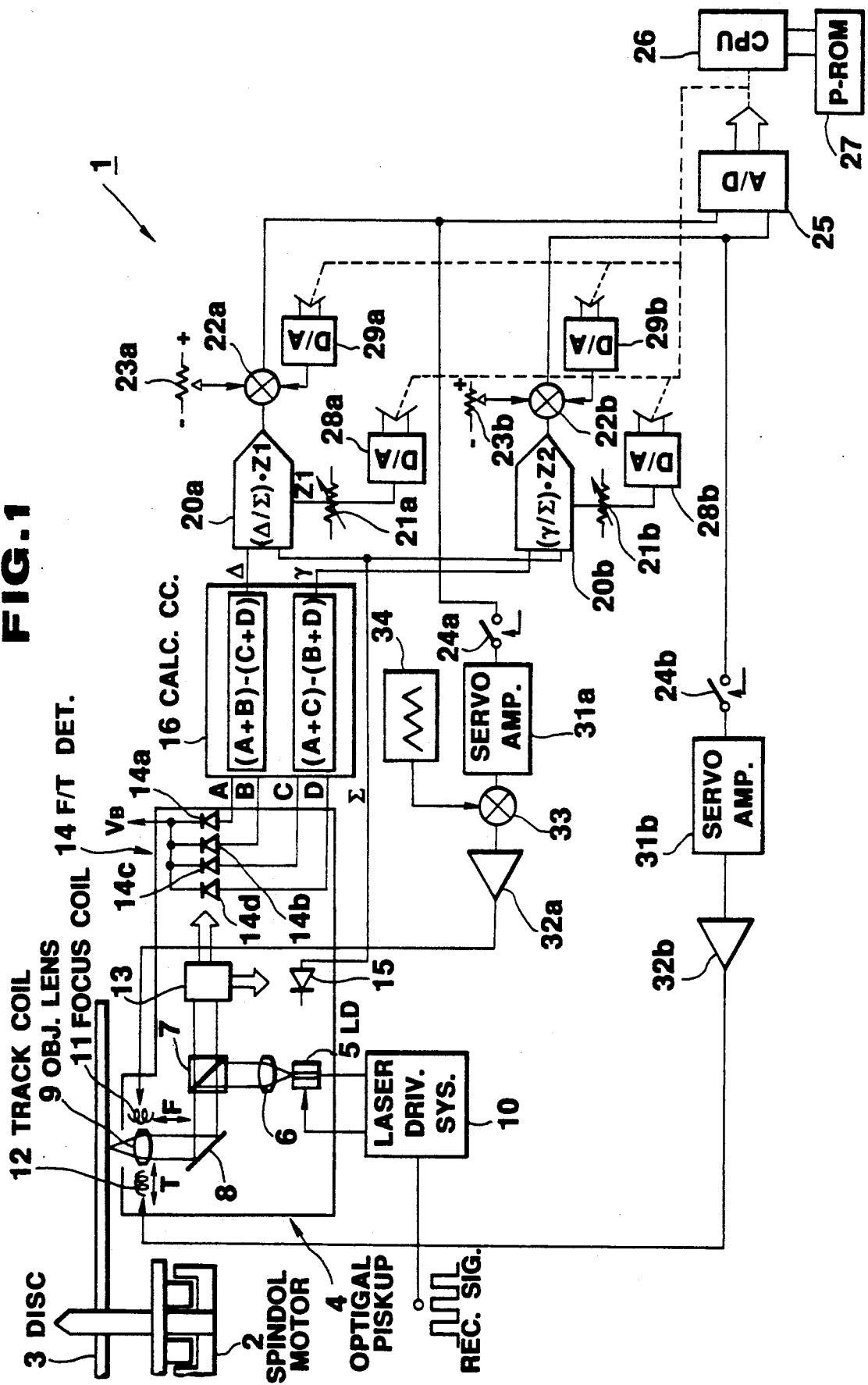

In an optical (information recording and reproducing) apparatus 1 of the first embodiment shown in FIG. 1, an optical pickup 4 for performing recording, reproducing, accessing and so forth is oppositely arranged to a recording medium (which shall be mentioned as a disc hereinafter) 3 which is rotated and driven by a spindle motor 2. This optical pickup 4 is movable in the radius direction of the disc 3, that is to say, in the traversing direction of a track by a voice coil motor (not illustrated) or the like.

In the above mentioned optical pickup 4, a laser diode 5 is stored as an optical beam generating means. After the laser light diffused and radiated from the laser diode 5 is converted into a light beam having a circle section radiated in the parallel direction which is not diffused by a collimator lens 6, the light is reflected by a half mirror 7 and further reflected by a mirror 8. Then, the light is condensed and projected onto the disc 3 through an objective lens 9. The laser diode 5 modulates an APC and a recording signal by a laser driving system 10.

The above mentioned objective lens 9 is controlled by a focus (driving) coil 11, which comprises a lens actuator, and a track (driving) coil 12 so that a beam spot projected onto the disc 3 can be controlled in a focus state and/or a tracking state.

The light reflected from the disc 3 advances to, for example, a detecting optical system 13 which includes a focus detecting system using a critical angle method and a track detecting system using a push-pull method through the objective lens 9, the mirror 8 and a half prism 7. By the detecting optical system 13, the light is led by a focus and/or track signal (detecting) detector (which shall be referred to as an F/T detector hereinafter) 14 and a reflected light intensity (detecting) detector 15.

The above mentioned F/T detector 14 is made up of quartered detector elements 14a, 14b, 14c and 14d which convert a change of light intensity into a current change so that each detected current value A, B, C and D is input into an operational circuit 16.

By this operational circuit 16, an addition and subtraction of current values, $(A+B)-(C+D)$ and $(A+C)-(B+D)$, are carried out and the focus error signal $\Delta$ and the track error signal $\gamma$ are output, respectively.

The focus error signal $\Delta$ and the track error signal $\gamma$ are input into a divider-and-multipliers 20a and 20b, respectively.

Also, the above mentioned reflected light intensity detector 15 is a detector for detecting the total reflected light intensity from the disc 3. An output signal $\Sigma$ of the detector 15 is input into the divider-and-multipliers 20a and 20b. Also, the divider-and-multipliers 20a and 20b can be equivalently made up of multiplier-and-multipliers or divider-and-dividers.

The divider-and-multipliers 20a and 20b divide the focus error signal $\Delta$ or the track error signal $\gamma$ by the output signal $\Sigma$ of the total intensity of reflected light of the detector 15, respectively, and convert them into values, $\Delta/\Sigma$, and $\gamma/\Sigma$, which are converted into displacement values, and which are not controlled by the light intensity.

In the above mentioned divider-and-multipliers 20a and 20b, sensitivity correction voltages Z1 and Z2 normalizing each difference of actuator sensitivity and of optical detecting sensitivity, are further input from variable resistors 21a and 21b, respectively, and are multiplied by the above mentioned values of $\Delta/\Sigma$ and $\gamma/\Sigma$ so that the values of $(\Delta/\Sigma) \times Z1$ and $(\gamma/\Sigma) \cdot Z2$ in which these differences of sensitivity are normalized are output.

For example, in the case in which the sensitivity of the actuator or the like is lower than usual, these values are previously set so that the sensitivity correction voltages Z1 and Z2 are larger than usual. Accordingly, the normalized focus error signal $(\Delta/\Sigma) \cdot Z1$ and the track error signal $(\gamma/\Sigma) \cdot Z2$ which are not dependent on the light intensity and the distribution of the light intensity and also not dependent on the difference of sensitivity are output.

These signals $(\Delta/\Sigma)\cdot Z1$ and $(\gamma/\Sigma)\cdot Z2$ are input into adders 22a and 22b, respectively, and the correction of a focus deviated (focus offset) portion and a track deviated (track offset) portion from variable resistors 23a and 23b as a bias applying means are carried out by adding. Also, the adders 22a and 22b can be equivalently made up of subtractors.

The signals output from the adders 22a and 22b are input into analog switches 24a and 24b and also input into a CPU 26 through an A/D converter 25.

In reference to the amplitude values which become a standard written in a P-ROM 27, this CPU 26 can control the correction of the dispersion of sensitivity and the correction of the focus and track offsets.

That is to say, output ends of D/A converters 28a and 28b connected to the variable resistors 21a and 21b, respectively (the output voltage of D/A converters 28a and 28b is applied to the both ends of variable resistors 21a and 21b), and the output ends of D/A converters 29a and 29b connected to the adders 22a and 22b can correct the dispersion of sensitivity according to the disc 3 which is actually used, a focus offset and a track offset so as to enable changing of the output voltage by the output of the CPU 26.

That is to say, by comparing and controlling the output of the adders 22a and 22b in the software within the CPU 26 by the A/D converter 25, the D/A converters 28a and 28b are used in the case in which the amplitude of error signal is automatically made uniform. Also, it is the D/A converters 29a and 29b that recognize the deviated portion of the bias in the A/D converter 25 and the CPU 26 and that automatically correct the deviated portion.

Also, as for the variable resistors 23a and 23b, the focus deviated portion is corrected by the variable resistor 23a and the track deviated portion (on symmetry) is corrected by the variable resistor 23b.

Also, the variable resistors 21a, 21b, 23a are used for compensating the difference of the sensitivity according to the dispersion of the disc, the dispersion of the sensitivity and the offset in the state in which the offset does not vary widely, by using, for example, the disc which becomes a standard.

The output signals of the above mentioned analog switches 24a and 24b are amplified by servo amplifiers 31a and 31b. The output of the servo amplifier 31b is directly input into a power amplifier 32b and the output of the servo amplifier 31a is input into a power amplifier 32a through an adder 33.

In the above mentioned adder 33, a triangular wave of a triangular wave generating apparatus 34 can be applied.

The above mentioned power amplifiers 32a and 32b amplify the power of each actuator to the extent of enabling the actuators to drive. The output signals of the power of the amplifiers 32a and 32b are input into the focus coil 11 and the track coil 12, respectively, so as to enable to move each objective lens 9 in the vertical direction F of the surface of the disc 3 and in the traversing direction T of the track.

The above mentioned analog switches 24a and 24b make the servo loop on and/or off. In the case of forming a servo system, the servo loop is made to be on.

Also, the servo amplifiers 31a and 31b correct the phase of the loop so as to be able to obtain a gain band of the loop and stability of the loop, sufficiently.

By this first embodiment, the focus error and track error signals without having offsets can be obtained at the constant sensitivity (the quantity of voltage for displacement).

The generation of the dispersion of the sensitivity of these error signals and the offset is chiefly dependent upon the following:

a. the optical deviation (the deviation of the optical characteristic, the deviation of position regulation); or b. the disc (the dispersion due to the difference of reflectance, the dispersion due to the difference of the track form).

Therefore, in the first embodiment, as mentioned hereinafter, a disc regarded as a standard is used and the dispersion of the sensitivity due to the optical deviation and the offset are removed by adjusting the variable resistors 21a, 21b, 23a and 23b in the state in which the dispersion of the disc is removed. Then, the disc is replaced with a disc actually used so as to remove the dispersion of the sensitivity due to the dispersion of the disc and the generation of offset by adjusting the output of the D/A converters 28a, 28b, 29a and 29b.

Next, the effect of the first embodiment will be explained in reference to FIGS. 2A, 2B and 3.

First of all, a standard disc to be the standard is used in which the curvature and the vibration of the surface of the disc 3 are controlled to a high degree and in which a pre-groove for tracking is formed very correctly to obtain a track error signal. That is to say, as shown in step S1 in FIG. 2A, the standard disc is set on a turntable.

Next, the analog switches 24a and 24b are made to be open and the servo system is made to be off as shown in step S2. In this case, as shown in step S3, the output of the D/A converters 28a and 29a is controlled to be a standard value or the median of output by the CPU 26.

In this state, as shown in step S4, by inputting a triangular wave from the triangular wave generating apparatus 34 into the adder 33, the objective lens 9 is vibrated in the vertical direction F of the disc surface through the focus coil 11. In this case, the reflected light from the rotating disc 3 is detected at the F/T detector 14 and a focus error signal $\Delta$ is generated through the operational circuit 16. The signal $\Delta$ is converted into a digital signal by the A/D converter 25 through the divider-and-multiplier 20a and the adder 22a and received by the CPU 26.

The CPU 26 detects the maximum and minimum values of the input digital signal (step S5) and calculates an amplitude and the amount of offset from these values (step S6). For the recognized amplitude and amount of offset, because the values of the amplitude and the amount of offset, 0, to be standard values are housed in the P-ROM 27, the variable resistors 21a and 23a are adjusted so as to remove a difference between these standard values and measured values input through the A/D converter 25 (step S7).

Thus, for the standard disc, the dispersion of the sensitivity of the focus servo system and the generation of offset are adjusted to a settled state.

After the adjustment of this focus servo system is completed, the track servo system will be adjusted.

In the same manner of the step S3, the output of the D/A converters 28b and 29b is controlled to be a standard value or the median of output by the CPU 26 (step S8). Then, if the analog switch 24a is closed to be the state of focus servo (step S9) and the analog switch 24b is open, the track error signal γ is output from the operational circuit 16 according to the decentering of the track.

For this track error signal γ, the variable resistors 21b and 23b are adjusted in the same manner of the case of the focus servo system.

That is to say, this track error signal γ is converted into a digital signal by the A/D converter 25 through the divider-and-multiplier 20b and the adder 22b, and received by the CPU 26.

This CPU 26 detects the maximum and minimum values of the input digital signal (step S10) and calculate an amplitude and an amount of offset from these values (step S11). For the obtained amplitude and amount of offset, because the values of the amplitude and the amount of offset, 0, to be a standard are housed in the P-ROM 27, the variable resistors 21b and 23b are adjusted so as to remove a difference between these standard values and measured values which are input through the A/D converter 25 (step S12).

Thus, for the standard disc, the dispersion of the sensitivity of the track error signal and the generation of offset can be adjusted to be a settled state by steps S8 to S12.

According to the above mentioned steps S1 to S12, the dispersion of the sensitivity and the generation of offset in the focus servo system and the track servo system can be settled for the standard disc.

If the dispersion of the disc 3 can be ignored, it is sufficient to adjust the above mentioned variable resistors 21a, 21b, 23a and 23b.

In other words, since the signal output from the adders 22a and 22b is unified as the type of voltage V/μm for the displacement of the sensitivity of the optical system, if it is mentioned that the sensitivity is unified as 1V/μm on the point of the adder 22a, the mechanical offset of the optical system is canceled each other if the optical system has a focus offset of +0.3 μm and if the variable resistor 23a is set at −0.3 V. Even if the light intensity varies or the reflectance of the disc 3 varies and even if the light intensity entering the F/T detector 14 increases and decreases, the sensitivity for the displacement of the adder 22a is kept constant by the divider-and-multiplier 20a and the variable resistor 21a. Because of this, even if the amount of the fixed offset is applied by the variable resistor 23a, the offset which is not dependent upon the fluctuation of the light intensity and which is dependent upon the deviation of the optical system can be canceled each other.

However, there are actually many cases in which the disc varies widely. In those cases, it is necessary that the apparatus can be further adjusted. Therefore, in the first embodiment, the operation shown in FIG. 2B is further carried out.

As a result of this, in the first embodiment, the D/A converters 28a, 28b, 29a and 29b are provided so that the apparatus can be dealt with by variably adjusting each D/A output by the CPU 26 even if the dispersion of the above mentioned disc varies widely.

As an operation, after adjusted by the above mentioned standard disc, the standard disc is replaced by the disc 3 which is actually used (step S13) and the deviated portion generated by the replacement is eliminated by the adjustment of the D/A output (step S14).

To be concrete, that is carried out in the same manner of the adjustment in accordance with the above mentioned variable resistors 21a, 21b, 23a and 23b. In this case, while the variable resistors 21a, 21b, 23a and 23b were adjusted by fixing the D/A output in the case above mentioned, the variable resistors 21a, 21b, 23a and 23b are fixed this time and the D/A output may be adjusted so as to make the D/A output fit to the standard value. The operational process of this adjustment is shown in FIG. 3. Here, for example, step S2, is the same as the step S2 in FIG. 2. Step 7' compensates the amplitude and the amount of offset by adjusting the output level of the D/A converters 28a and 29a instead of the variable resistors 21a and 23a in step S7. Also, step S12' compensates the amplitude and the amount of the offset by adjusting the output level of the D/A converters 28b and 29b instead of the variable resistors 21b and 23b in step S12.

Thus, the apparatus can also deal with the case in which the actually used disc 3 varies widely.

In the first embodiment, while the divider-and-multipliers 20a and 20b are normalized by the total reflected light intensity to obtain the focus and track error signals for carrying out a servo control, the focus and track error signals which have compensated the detecting sensitivity of the F/T detector 14 and/or the sensitivity of the actuator are obtained. Therefore, the apparatus can deal with the case in which the entering light intensity varies. In other words, even if an intensity ratio of the entering light intensity varies widely as in the case in which the reproducing mode is changed into the recording mode or in which the recording mode is changed into the reproducing mode, conversely, the apparatus works without being subject to the influence of the above mentioned variation.

Also, the apparatus can easily deal with the case in which the sensitivity of the actuator or the like varies as the exchange of the optical pickup 4 by adjusting the output levels of the variable resistors 21a and 21b and/or of the D/A converters 28a and 28b.

Accordingly, without depending on the change of the light intensity of the laser diode 5 and/or the change of the reflectance of the disc 3, the gain of the servo loop can be kept constant and a stable optical recording and/or reproducing apparatus which can cancel the optical offset can be materialized.

Also, when the optical system is adjusted, the number of manufacturing processes can be decreased because a fine deviation can be electrically adjusted if a rough mechanical adjustment is performed.

According to this first embodiment, within the range of regular use except for the case in which the disc varies widely to the extreme degree, an user is able to record and reproduce under nearly a suitable servo state if the variable resistors 21a, 21b, 23a and 23b are manually adjusted to make the servo system a suitable (standard) adjusting state by, for example, using the standard disc after the apparatus is assembled at a factory.

In this first embodiment, a suitable servo state can be automatically established by the output through the D/A converters 28a, 28b, 29a and 29b by the CPU 26 if a disc which varies widely is used after adjusted by the standard disc. In order to make the structure of the apparatus simpler, for example, the variable resistor 21a and the D/A converter 28a as the sensitivity compensating elements of the focus servo can be replaced only by the D/A converter 28a. In this case, if an adjustment is manually carried out, the D/A converter 28a may be replaced by the variable resistor 21a. That may be adapted to other compensating elements.

Figure 4:
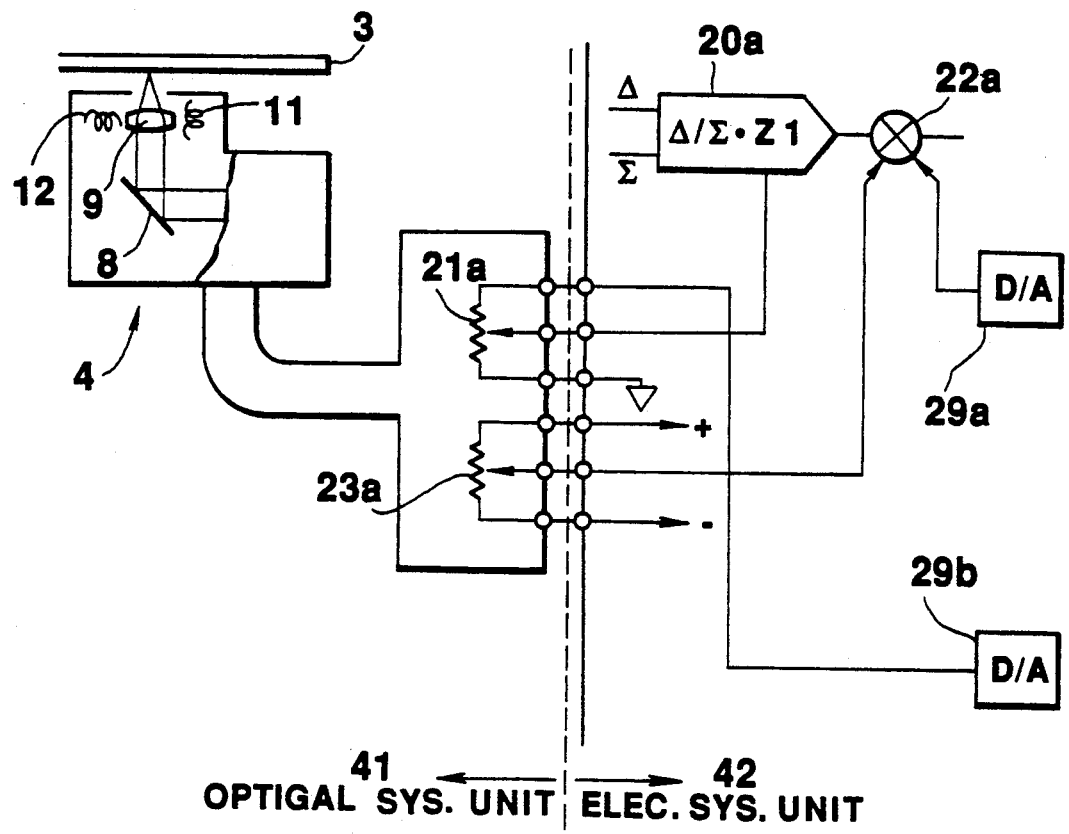
FIG. 4 is a diagram showing a main part of an optical information recording and reproducing apparatus of the second embodiment of this inventor.

FIG. 4 shows a main part in the second embodiment of this invention.

In this second embodiment, by considering the maintenance of the apparatus, the structure is shown in the case in which an unit is divided.

The variable resistors 21a and 23a which are the elements for correcting the deviation of the optical system and the dispersion of the detecting sensitivity are included on the side of an optical system unit (optical pickup unit) 41 so that the optical system unit 41 is separated from an electrical system unit 42.

Therefore, even if one of the units 41 and 42 is exchanged or combined with a new unit, it is very convenient that the unit on the side which is not exchanged becomes a sufficiently adjusted state with almost no readjustment.

Also, if one of these units breaks down, only an exchange of one unit makes it possible to exhibit the performance of the apparatus because each unit can be separately adjusted.

According to this second embodiment, besides the effect of the first embodiment, even if an optical pickup has different offset of the optical system and different detecting sensitivity, respectively, the dispersion can be canceled by adjusting a correction element included in a new optical pickup even if the pickup is exchanged at the maintenance and the same performance as shown prior to the exchange can be obtained because the correction element is contained in the optical pickup unit.

In the second embodiment, although the optical system unit 41 is separated from the electrical system unit 42, for example the optical system unit 41 may be a further unit (for example, the F/T detector 14 may be a different unit from the other optical systems).

Figure 5:
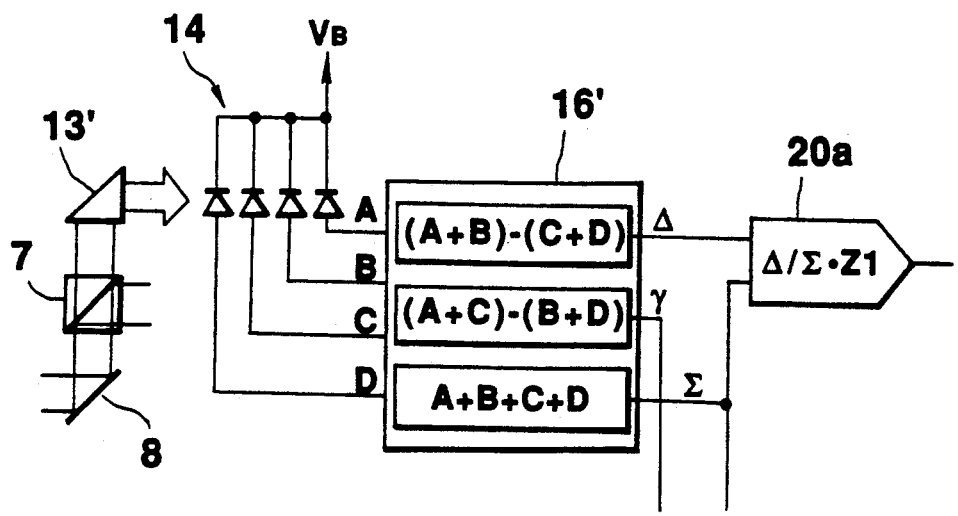
FIG. 5 is an illustration showing a main part of the third embodiment of this invention.

Also, as shown in FIG. 5, the sum signal of the F/T detector 14 may be used in place of the detector 15 for detecting the total reflected light intensity.

In FIG. 5, the light passed through the half mirror 7 is received by the F/T detector 14 through a critical angle prism 13'. The signal which is photoelectrically converted by the F/T detector 14 is operated by an operational circuit 16' and the output signal Σ which is proportional to the focus error signal Δ, the track error signal γ and the total reflected light intensity is generated.

Also, the variable resistors 21a, 21b, 23a and 23b are made up of the electronic volume and controlled by the CPU 26 so as to correct the dispersion of the sensitivity and so forth and also may be automatically (not manually) adjusted.

Also, it is clear that this invention can be applied to at least one of both focus and tracking servo systems.

As mentioned above, according to this invention, for the signal of the photoelectrically converting means for detecting the focus error signal and/or track error signal, the correcting means for generating a normalized error signal which is not dependent upon the light intensity and/or the distribution of the light intensity and also is not dependent upon the sensitivity of the actuator or the like and the bias applying means for deleting an offset or the like are provided. Therefore, even if the laser light intensity varies and even if the dispersion of the offset of the optical system exists, a highly precise servo system which is not affected by the dispersion and the offset can be materialized.

Further, different embodiments can be composed by combining the above mentioned each embodiment.

What is claimed is:

1. An optical information recording and/or reproducing servo apparatus comprising:

an optical pickup including a light beam generating means generating a light beam for recording and-/or reproducing information, an optical system condensing and projecting said light beam onto a recording medium and leading reflected light from said recording medium to a light detector, and an actuator moving a portion of said optical system;

an error signal generating circuit generating a focus error signal and a track error signal for focusing and tracking the light beam condensed and projected onto said recording medium corresponding to an output signal; from said light detector;

a light intensity signal generating means generating a light intensity signal in proportion to a sum total of reflected light from said recording medium;

a compensating circuit generating a compensating signal for compensating a change of said focus error signal and/or track error signal for a servo control sensitivity of said servo apparatus;

an operational circuit generating a normalized focus error signal and/or track error signal being independent of the total sum of the reflected light from said recording medium by using said focus error signal and/or track error signal, said light intensity signal, and said compensating signal, and further being independent of the fluctuation related to the sensitivity of said servo control;

a bias applying circuit compensating an offset portion for the normalized focus error signal and/or track error signal of said operational circuit; and a driving circuit driving said actuator by amplifying the normalized focus error signal and/or track error signal, and an offset portion of the normalized focus error signal and/or track error signal being compensated through said bias applying circuit.

2. An apparatus according to claim 1 wherein said compensating circuit generates a first and second compensating signals for compensating the change of said focus error signal and said track error signal.

3. An apparatus according to claim 1 wherein said operational circuit includes a first and second operational circuits generating the normalized focus error signal and track error signal for said focus error signal and said track error signal, respectively.

4. An apparatus according to claim 3 wherein said bias applying circuit includes a first and second bias applying circuits compensating an offset portion for the normalized focus error signal and/or track error signal of said first and second operational circuits.

5. An apparatus according to claim 1 wherein said operational circuit equivalently includes a light intensity compensating means for producing the focus error signal and/or track error signal being independent of the total sum of the reflected light from said recording medium by dividing said focus error signal and/or track error signal by said light intensity signal, and further comprising a sensitivity compensating means for compensating for sensitivity of said light intensity compensating means.

6. An apparatus according to claim 1 wherein said compensating circuit comprises a variable resistor.

7. An apparatus according to claim 1 wherein said compensating circuit is comprised by a D/A converter.

8. An apparatus according to claim 6 wherein said compensating circuit includes a D/A converter, and said compensating circuit being able to increase and decrease an output level supplied from said compensating circuit to said operational circuit.

9. An apparatus according to claim 8 wherein the output level of said compensating circuit is controlled by a CPU.

10. An apparatus according to claim 1 wherein said bias applying circuit comprises the variable resistor for a level shift compensating said offset portion and an adder and/or subtracter for adding and/or subtracting the output of said variable resistor and said operational circuit.

11. An apparatus according to claim 10 wherein said bias applying circuit further includes a D/A converter, said bias applying circuit being able to shift the output level of said adder and/or subtracter.

12. An apparatus according to claim 11 wherein the output level of said bias applying circuit is controlled by a CPU.

13. An optical information recording and/or reproducing servo apparatus comprising:
an optical pickup including a light beam generating means generating a light beam for recording and/or reproducing information, an optical system condensing and projecting said light beam onto a recording medium and leading reflected light from said recording medium to a light detector, and an actuator moving a portion of said optical system;
an error signal generating circuit generating a focus error signal and a track error signal for focusing and tracking the light beam condensed and projected onto said recording medium corresponding to an output signal from said light detector;
a light intensity signal generating means generating a light intensity signal in proportion to a sum total of reflected light from said recording medium;
a compensating circuit generating a compensating signal for compensating a change of said focus error signal and/or track error signal for a servo control sensitivity of said servo apparatus;
an operational circuit generating a normalized focus error signal and/or track error signal being independent of the total sum of the reflected light from said recording medium by using said focus error signal and/or track error signal, said light intensity signal, and said compensating signal, and further being independent of the fluctuation related to the sensitivity of said servo control;
a bias applying circuit compensating an offset portion for the normalized focus error signal and/or track error signal of said operational circuit; and
a driving circuit driving said actuator by amplifying the normalized focus error signal and/or track error signal, and an offset portion of the normalized focus error signal and/or track error signal being compensated through said bias applying circuit;
in a case in which said servo apparatus is composed of a plurality of units, at least a circuit of said compensating circuit and said bias applying circuit has a compensating element for actually compensating only the offset portion related to the sensitivity of said servo control caused by a constituent within one of said plurality of units which includes the compensating element as one body.

14. An apparatus according to claim 13 wherein said one of said plurality of units which includes said compensating element as one body is said optical pickup.

* * * * *